US007334743B2

(12) United States Patent
Wintering et al.

(10) Patent No.: US 7,334,743 B2
(45) Date of Patent: Feb. 26, 2008

(54) FOG GENERATING SYSTEM AND METHOD OF INSTALLING SAME

(75) Inventors: Gary F. Wintering, Chandler, AZ (US); Jeffrey D. Beeman, Tempe, AZ (US); Alan M. Whitaker, Maricopa, AZ (US); Steve B. Kizziar, Gilbert, AZ (US)

(73) Assignee: Fogco Systems, Inc., Chandler, AZ (US)

( * ) Notice: Subject to any disclaimer, the term of this patent is extended or adjusted under 35 U.S.C. 154(b) by 303 days.

(21) Appl. No.: 10/946,797

(22) Filed: Sep. 22, 2004

(65) Prior Publication Data

US 2006/0060676 A1 Mar. 23, 2006

(51) Int. Cl.
*A01G 25/06* (2006.01)

(52) U.S. Cl. .......................... 239/200; 4/524; 4/541.4; 239/208; 239/202

(58) Field of Classification Search .................. 239/34, 239/200, 201, 202, 203, 204, 205, 206, 207, 239/208, 209, 30, 210, 542, 550, 566; 4/492, 4/496, 507, 524, 541.4, 541.5, 541.6, 567, 4/568, 570
See application file for complete search history.

(56) References Cited

U.S. PATENT DOCUMENTS 217,843 A * 7/1879 Binga .......................... 239/200
218,024 A * 7/1879 Hennessy et al. ........... 239/202
549,587 A * 11/1895 Schultze ...................... 239/200
789,588 A * 5/1905 Case ........................... 239/202
2,439,866 A * 4/1948 Saladin ........................ 210/169
3,411,163 A * 11/1968 Myers, Jr. .................... 126/566
3,490,081 A * 1/1970 Ogden ............................ 4/510
3,577,571 A * 5/1971 Bellinson et al. .............. 4/492
3,625,427 A * 12/1971 Nadkarni et al. ........... 239/124
4,039,144 A 8/1977 Mee
4,262,371 A * 4/1981 Berry et al. ..................... 4/678

(Continued)

FOREIGN PATENT DOCUMENTS

FR 2574833 A1 * 6/1986

OTHER PUBLICATIONS

Internet Print out:□□www.howibuiltmyownpool.com/□□(Sep. 7, 2006).*

*Primary Examiner*—Kevin Shaver
*Assistant Examiner*—Trevor McGraw
(74) *Attorney, Agent, or Firm*—Jordan M. Meschkow; Lowell W. Gresham; Charlene R. Jacobsen

(57) ABSTRACT

A fog generating system (20) includes a fluid feed conduit (22) and extension tube assemblies (26) spaced along the conduit (22). The assemblies (26) include nozzle fittings (40) coupled to extension tubes (32). Misting nozzles (44) are releasably engaged with the nozzle fittings (40), and are recessed within the nozzle fittings (40). Installation entails arranging the system (20) on an interior side of an installation form (90), and securing the nozzle fittings (40) using fitting plugs (50) so that an open ends (60) of the nozzle fittings (40) abut the form (90). The fitting plugs (50) further form a fluid resistant seal for maintaining the assemblies (26) under fluid pressure during installation. The system (20) is embedded in a concrete material (124) for the structure (120). Following removal of the installation form (90) and the fitting plugs (50), the misting nozzles (44) are installed within the nozzle fittings (40).

12 Claims, 7 Drawing Sheets

U.S. PATENT DOCUMENTS

| | | | | |
|---|---|---|---|---|
| 4,281,422 | A * | 8/1981 | Simonelli | 4/496 |
| 4,368,550 | A * | 1/1983 | Stevens | 4/507 |
| 5,203,082 | A | 4/1993 | Bontems | |
| 5,441,202 | A | 8/1995 | Wintering et al. | |
| 5,740,970 | A | 4/1998 | Edwards | |
| 5,915,849 | A * | 6/1999 | Dongo | 4/541.6 |
| 5,933,883 | A * | 8/1999 | Biancamano | 4/492 |
| 6,095,434 | A | 8/2000 | Montenegro | |
| 6,264,120 | B1 | 7/2001 | Wintering et al. | |
| 6,592,053 | B2 | 7/2003 | Ericksen et al. | |
| 2004/0194475 | A1* | 10/2004 | Gonzalez | 62/50.4 |

* cited by examiner

20

FOG GENERATING SYSTEM AND METHOD OF INSTALLING SAME

TECHNICAL FIELD OF THE INVENTION

The present invention relates to the field of aesthetic appearance of pools, ponds, or spas. More specifically, the present invention relates to the incorporation of a fog generating system in a structure, for example, in the decking surrounding a pool to enhance the aesthetic appearance of the structure.

BACKGROUND OF THE INVENTION

Swimming is a favored recreational activity, especially in warm climates where residential swimming pools are prevalent. Individuals enjoy the beneficial aspects of water-based exercise and the convenience afforded by having a swimming pool in their own backyards. Pools also provide simple physical relaxation and leisure time enjoyment for those not necessarily desiring physical exercise, but simply seeking to relax in the privacy in their backyard. In addition, the swimming pool and surrounding deck areas are often a central attraction around which parties, dinners, and the like are hosted.

In recent years, many homeowners have begun transforming their backyards into outdoor “rooms” that include outdoor kitchens, multiple seating areas, vegetation, sport courts, putting greens, and the like. To the homeowners, these spaces are as important to their families’ quality of life as the interior of their homes. These homeowners are also seeking unique water features to enhance the appearance of their swimming pools and spas.

For aesthetic appearance, waterfalls are often used in a swimming pool, pond, spa, or the like. A waterfall can add natural calming beauty to the pool, enhancing the quality of time spent in or beside the pool. However, the sound of the water spilling over the waterfall can sometimes overwhelm conversations and/or music during social gatherings, which may be irritating to some individuals. In addition, as waterfalls become more affordable, they too, are becoming increasingly common.

Accordingly, what is needed is a unique water feature for a structure, such as a pool, pond, spa, or the like that enhances its aesthetic appearance, is quiet, and is easily maintained.

SUMMARY OF THE INVENTION

Accordingly, it is an advantage of the present invention that a fog generating system is provided.

It is another advantage of the present invention that a fog generating system is provided that is configured for incorporation into a structure.

Another advantage of the present invention is that a fog generating system is provided that imparts a rolling fog bank across the surface of a body of water.

Yet another advantage of the present invention is that a fog generating system is provided that is straightforward to install and is readily maintained.

The above and other advantages of the present invention are carried out in one form by a fog generating system that includes a fluid feed conduit and extension tubes spaced along the fluid feed conduit. The fog generating system further includes nozzle fittings, one each of the nozzle fittings being coupled to one each of the extension tubes. Misting nozzles are releasably engaged with the nozzle fittings such that the misting nozzles are recessed within the nozzle fittings.

The above and other advantages of the present invention are carried out in another form by a method of incorporating a fog generating system of misting nozzles into a structure. The fog generating system includes a fluid feed conduit, extension tubes spaced along the fluid feed conduit, and nozzle fittings coupled to the extension tubes. The method calls for arranging the fog generating system on an interior side of an installation form for the structure. The nozzle fittings are secured such that an open end of each of the nozzle fittings abuts the installation form. The fog generating system is embedded in a concrete material to form the structure, and following removal of the installation form, one of the misting nozzles is installed through the open end into a cavity of each of the nozzle fittings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

The present invention includes a fog generating system, components thereof, and methodology for incorporating the fog generating system into a structure. In a preferred embodiment, the structure is the concrete decking material that surrounds a swimming pool. Once installed, the fog generating system imparts a rolling fog bank across the water surface of the swimming pool. It should be understood, however, that the present invention may be incorporated into other water-based structures, such as a spa, pond, commercial pool, water- or theme-park attraction, and the like. It should be further understood that the present invention need not be limited to incorporation with water-based structures, but may be adapted for incorporation into walkways, decks, awnings, and so forth.

Figure 1:
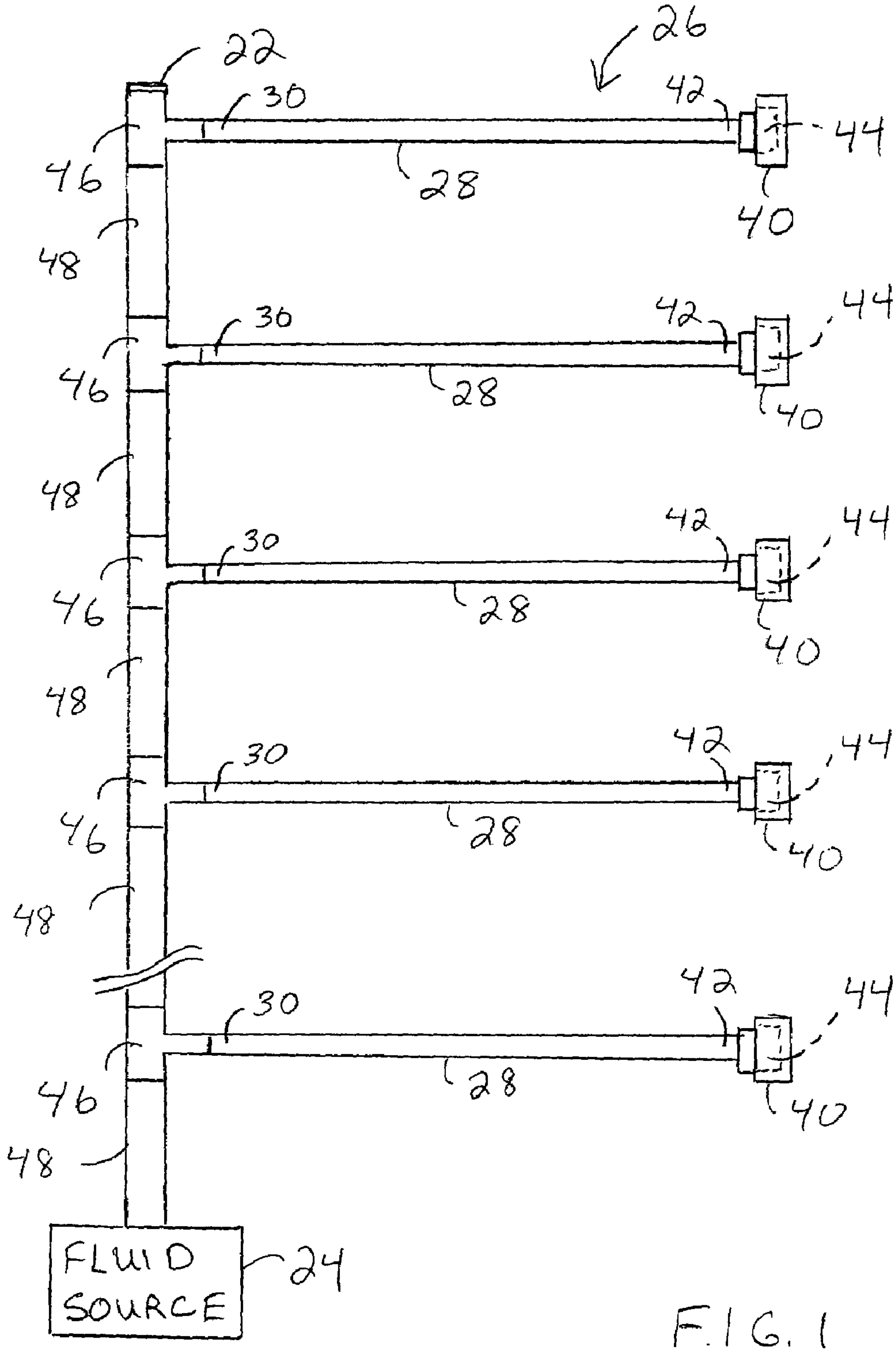
FIG. 1 shows a block diagram of a fog generating system in accordance with a preferred embodiment of the present invention.

Referring now to FIG. 1, FIG. 1 shows a block diagram of a fog generating system 20 in accordance with a preferred embodiment of the present invention. Fog generating system 20 includes a fluid feed conduit 22 in fluid communication with a fluid source 24. Fluid source 24 may be a pump and water spigot, as known to those skilled in the art, for providing water to fluid feed conduit 22. Fog generating system 20 further includes a plurality of nozzle extension assemblies 26 spaced along fluid feed conduit 22.

Figure 2:
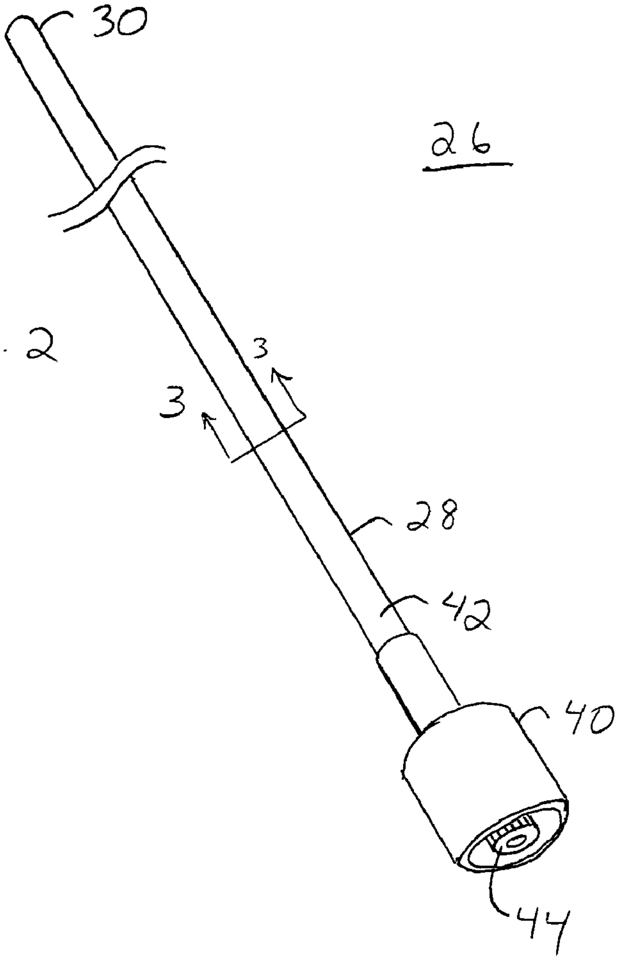
FIG. 2 shows a perspective view of a nozzle extension assembly of the fog generating system of FIG. 1.
Figure 3:
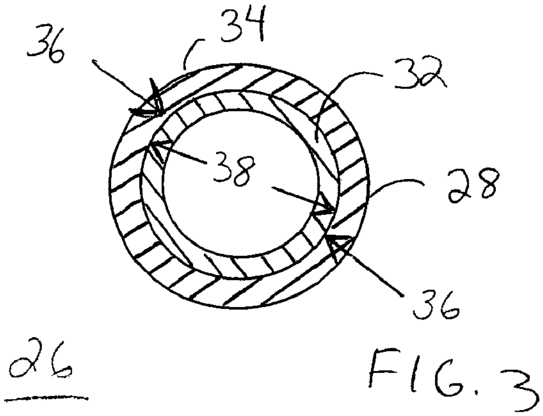
FIG. 3 shows a sectional view of the nozzle extension assembly across section 3-3 of FIG. 2.

Referring to FIGS. 2-3 in connection with FIG. 1, FIG. 2 shows a perspective view of one of nozzle extension assemblies 26 of fog generating system 20 (FIG. 1), and FIG. 3 shows a sectional view of nozzle extension assembly 26 across section 3-3 of FIG. 2. Nozzle extension assembly 26 will be discussed in the singular form below. However, it should be understood that the features of nozzle extension assembly 26 described below apply equally to all nozzle extension assemblies 26 that make up fog generating system 20.

Nozzle extension assembly 26 includes an extension tube system 28 having a first end 30 configured for attachment to fluid feed conduit 22. Extension tube system 28 includes an extension tube 32 and a protective sleeve 34 encasing extension tube 32. In a preferred embodiment, protective sleeve 34 exhibits an inner diameter 36 that corresponds to an outer diameter 38 of extension tube 32. More specifically, inner diameter 36 of protective sleeve 34 is only slightly larger than outer diameter 38 of extension tube 32 to form a snug, friction fit between protective sleeve 34 and extension tube 32. The advantages of this friction fit will be described below in connection with the incorporation of fog generating system 20 into a structure.

Nozzle extension assembly 26 further includes a nozzle fitting 40 attached to a second end 42 of extension tube system 28. A misting nozzle 44 of fog generating system 20 is engaged with nozzle fitting 40 such that misting nozzle 44 is recessed within nozzle fitting 40. Thus, nozzle extension assemblies 26 are configured for interconnection between fluid feed conduit 22 (i.e., the fluid source for nozzle extension assemblies 26), and a number of misting nozzles 44.

Fabrication of fog generating system 20 entails soldering nozzle fitting 40 to the end of extension tube 32 corresponding to second end 42 of extension tube system 28 so that nozzle fitting 40 is fixedly coupled to extension tube 32. In a preferred embodiment extension tube 32 is an approximately twenty-four inch long length of one quarter inch soft copper so that extension tube 32 can be readily bent and formed as needed.

Protective sleeve 34 is then slid onto extension tube 32. Protective sleeve 34 may be thin walled nylon tubing, polyethylene tubing, or the like. Protective sleeve 34 does not support any fluid pressure. Rather, protective sleeve 34 protects the copper material of extension tube 32 from reaction with a concrete material into which fog generating system 20 may be embedded. In addition, the snug fit between extension tube 32 and protective sleeve 34 largely prevents the copper extension tube 32 from kinking when it is bent because its shape is held by the inner wall of protective sleeve 34. Accordingly, extension tube system 28 can sustain a tight bend radius with little concern for kinking the copper extension tube 32.

Once protective sleeve 34 is positioned on extension tube 32, an end of extension tube 32 corresponding to first end 30 of extension tube system 28 is soldered to a T-fitting 46. The three-way T-fitting 46 is then soldered to an approximately eighteen inch length of soft or rigid three-eighths inch copper tubing 48 to form part of fluid feed conduit 22. In an exemplary fog generating system, this may be repeated until a final length of ten feet is achieved for a subassembly made up of fluid feed conduit 22 with seven nozzle extension assemblies 26. Of course, this technique may be repeated to whatever final length of fluid feed conduit 22 and any number of nozzle extension assemblies 26 is desired. Once assembled, fluid feed conduit 22 may also be wrapped in a protective material to protect T-fittings 46 and copper tubing 48 from reaction with the concrete material in which fog generating system 20 may be embedded.

Figure 4:
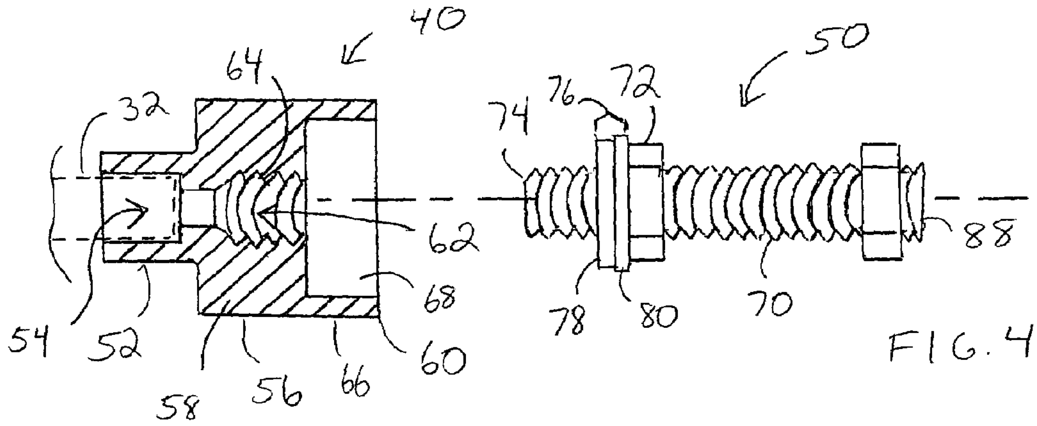
FIG. 4 shows side sectional view of a nozzle fitting of the fog generating system with a side view of a fitting plug in accordance with the present invention.
Figure 5:
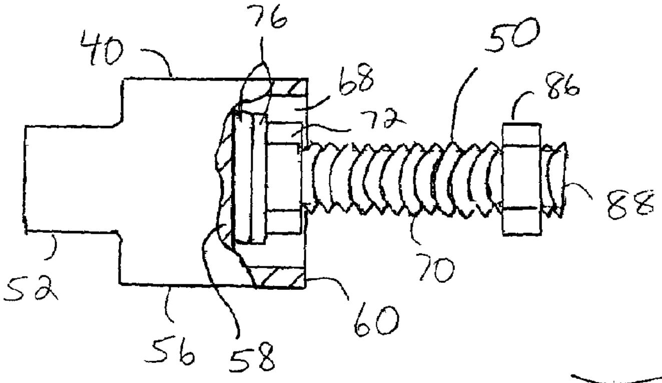
FIG. 5 shows a side view of the nozzle fitting of FIG. 4 partially cut away to reveal the fitting plug of FIG. 4 in temporary connection with the nozzle fitting.

Referring to FIGS. 4-5, FIG. 4 shows a side sectional view of nozzle fitting 40 of fog generating system 20 (FIG. 1) with a side view of a fitting plug 50 in accordance with the present invention. FIG. 5 shows a side view of nozzle fitting 40 partially cutaway to reveal fitting plug 50 in temporary connection with nozzle fitting 40. Fog generating system 20 is designed to be embedded in a concrete material, such as a poolside deck. In a preferred embodiment, fog generating system 20 is placed under fluid pressure on the job site to check for leaks and to ensure that fluid feed conduit 22 and nozzle extension assemblies 26 are not structurally compromised during the construction of the pool and/or poolside deck. Fitting plug 50 serves to “plug” or block nozzle fitting 40 so that system 20 may be pressurized.

Fitting plug 50 further advantageously functions to fix nozzle fitting 40 in place prior to pouring concrete material to ensure that nozzle fitting 40 does not move during the pouring of the concrete. Fitting plugs 50 are desirably coupled to each of nozzle fittings 40 during the fabrication of system 20, and supplied to the job site connected with fog generating system 20.

First referring to nozzle fitting 40, nozzle fitting 40 includes a hollow stem 52 in which a channel 54 is in fluid communication with extension tube 32 (shown in ghost form). Hollow stem 52 is the portion of nozzle fitting 40 that is fixedly attached to extension tube 32 by soldering. Nozzle fitting 40 further includes a body 56 having a base end 58 and an open end 60. As shown, hollow stem 52 is coupled to base end 58.

Base end 58 includes a passage 62 in fluid communication with channel 54 of hollow stem 52. Passage 62 includes a threaded portion 64 for releasable engagement with either fitting plug 50 or misting nozzle 44 (FIG. 3). An intermediate portion 66 of nozzle fitting 40 is interposed between base end 58 and open end 60. Intermediate portion 66 includes a cavity 68 in which a portion of fitting plug 50 may be seated, or alternatively, in which misting nozzle 44 may be positioned.

Referring now to fitting plug 50, fitting plug 50 includes a continuous-thread stud 70 for threaded attachment with threaded portion 64 of passage 62. A first threaded fastener 72 is engaged with stud 70 and is located proximate a first end 74 of stud 70. A sealing washer 76 is directed onto stud 70 and is positioned between first end 74 and first threaded fastener 72. Sealing washer 76 may be a neoprene encased washer or some other a compressible material. In this exemplary embodiment, sealing washer 76 includes a compressible layer 78, such as neoprene, bonded to a rigid washer 80, with rigid washer 80 abutting first threaded fastener 72.

Stud 70 is first attached with threaded portion 64 of passage 62. First threaded fastener 72 is then tightened against sealing washer 76 so that sealing washer 76 is disposed between base end 58 of nozzle fitting 40 and first threaded fastener 72. When first threaded fastener 72 is tightly installed, compressible layer 78 compresses against base end 58 to create a fluid resistant seal at passage 62 of base end 58.

In addition, when stud 70 is engaged with threaded portion 64 of nozzle fitting 40, stud 70 extends beyond open end 60 of nozzle fitting 40. A second threaded fastener 86 is engaged with stud 70 proximate a second end 88 of stud 70. System 20 is configured for installation in cooperation with an installation form, sometimes referred to as a bender board or a formboard. Second threaded fastener 86 and stud 70 function cooperatively to fix nozzle extension assembly 26 (FIG. 1) relative to the installation form.

Figure 6:
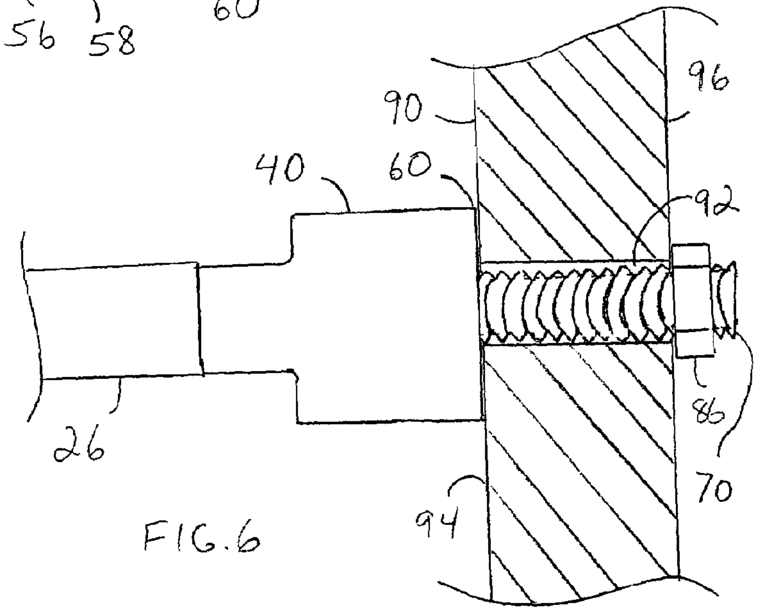
FIG. 6 shows a side view of the nozzle fitting of FIG. 4 abutting an installation form.

FIG. 6 shows a side view of nozzle fitting 40 of nozzle extension assembly 26 abutting an installation form 90. Detailed installation methodology will be provided in connection with FIGS. 9-11. However, FIG. 6 is provided to illustrate the routing of stud 70 through an opening 92 in installation form 90 with nozzle fitting 40 being located on a first side 94 of installation form 90 and second threaded fastener 86 being engaged with stud 70 on a second side 96 of installation form 90. As second threaded fastener 86 is tightened onto stud 70, nozzle fitting 40 is pulled toward installation form 90 until open end 60 of nozzle fitting 40 abuts first side 94 of installation form 90. The continuous-thread feature of stud 70 advantageously enables stud 70 to be utilized with various thicknesses of installations forms, and enables the attachment, tightening, and disconnection of fasteners on each of stud 70.

Figure 7:
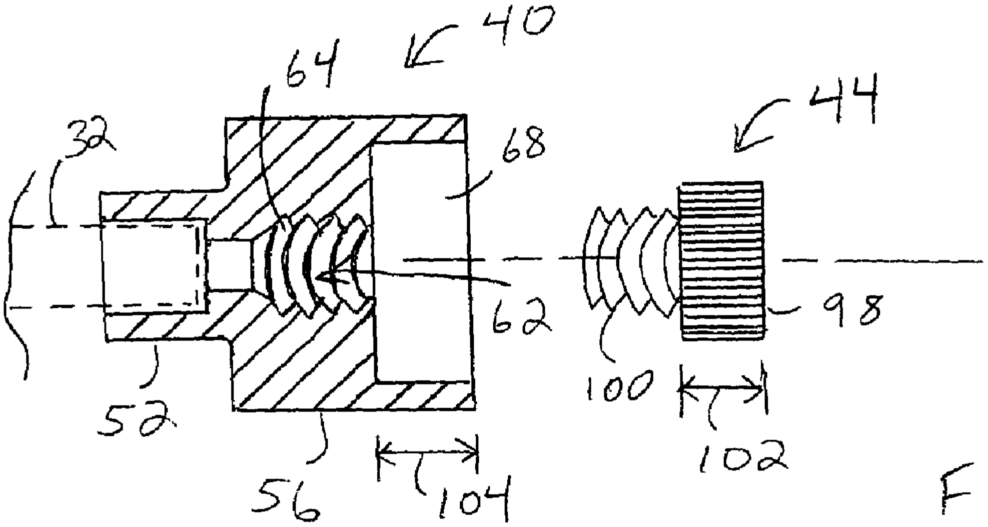
FIG. 7 shows a side sectional view of the nozzle fitting of the fog generating system with a side view of a misting nozzle in accordance with the present invention.
Figure 8:
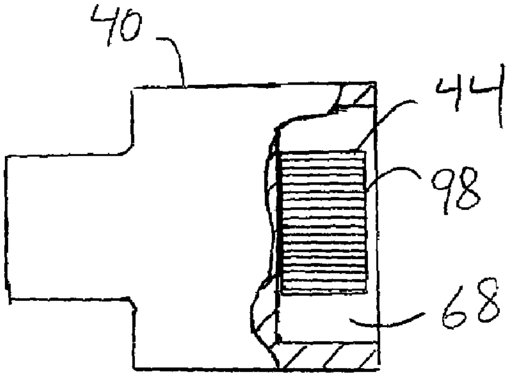
FIG. 8 shows a side view of the nozzle fitting of FIG. 7 partially cut away to reveal the misting nozzle of FIG. 7 engaged with the nozzle fitting.

Referring to FIGS. 7-8, FIG. 7 shows a side sectional view of nozzle fitting 40 of fog generating system 20 with a side view of one of misting nozzles 44 in accordance with the present invention. FIG. 8 shows a side view of nozzle fitting 40 partially cutaway to reveal misting nozzle 44 engaged with nozzle fitting 40. As mentioned above, nozzle fitting 40 can accommodate either fitting plug 50 (FIG. 4) or misting nozzle 44.

Misting nozzle 44 includes a nozzle head 98 coupled to a threaded stem 100. In an exemplary embodiment, nozzle head 98 of misting nozzle 44 may have an orifice size of fifteen one-thousandths of an inch for producing small droplets reminiscent of the droplet size in actual fog. However, other orifice sizes may be utilized in accordance with desired fog density.

Nozzle head 98 exhibits a height 102. In a preferred embodiment, cavity 68 exhibits a depth 104 that is at least equivalent to height 102. As such, when threaded stem 100 of misting nozzle 44 is engaged with threaded portion 64 of passage 62 in nozzle fitting 40, misting nozzle 44 is fully recessed within cavity 68 of nozzle fitting 40. Consequently, when fog generating system 20 (FIG. 1) is incorporated into a structure, misting nozzles 44 are hidden thus yielding an aesthetically pleasing appearance. Moreover, misting nozzles 44 are protected from damage since they are fully recessed, yet, they may still be readily disconnected from nozzle fittings 40 for servicing, replacement, and/or cleaning.

Figure 9:
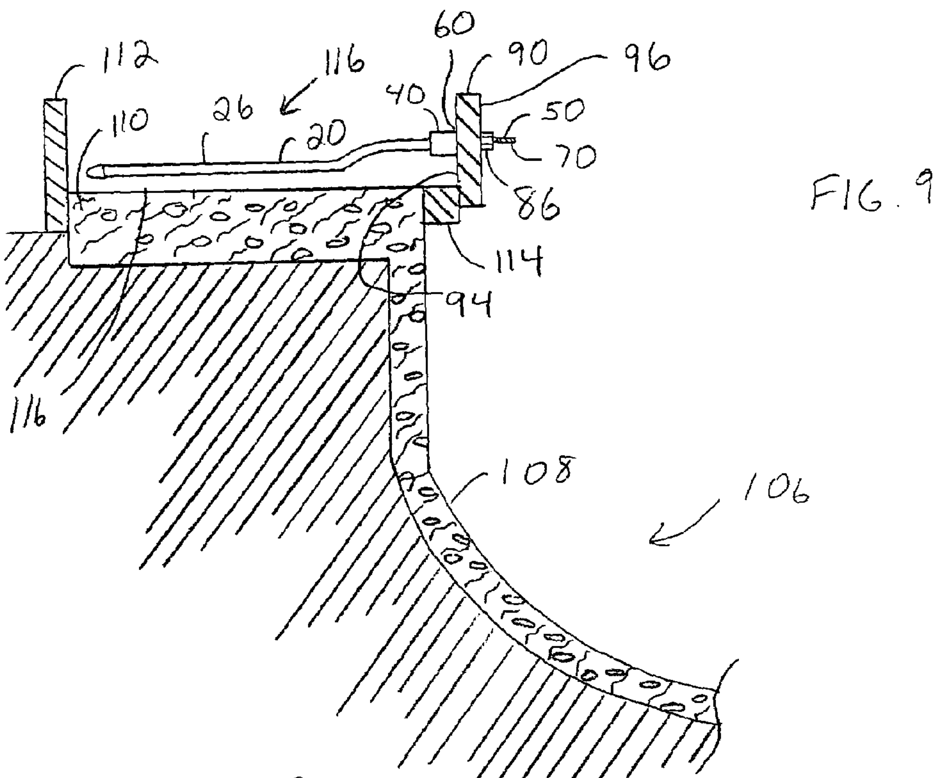
FIG. 9 shows a side sectional view of a portion of a swimming pool into which the fog generating system of FIG. 1 is being incorporated.

FIG. 9 shows a side sectional view of a portion of a swimming pool 106 into which fog generating system 20 is being incorporated. Construction of swimming pool 106 entails, among other things, the pouring of a concrete wall 108 and a bond beam 110 on top of concrete wall 108. As known to those skilled in the art, bond beam 110 is typically reinforced with steel rods and supplies lateral support, as well as distributes concentrated vertical loads along wall 108. Once bond beam 110 is set, installation form 90, a second installation form 112, and a spacer board 114 are installed in preparation for pouring a concrete decking structure, as known to those skilled in the art.

Next, fog generating system 20 is arranged between installation form 90 and second installation form 112. For example, a ten foot long subassembly of fluid feed conduit 22 (FIG. 1) with seven attached nozzle extension assemblies 26 (FIG. 1) is laid over bond beam 110 in an interior space 116 between installation form 90 and second installation form 112. If more than one subassembly is utilized, corresponding ends of fluid feed conduit 22 are soldered together.

It bears repeating that nozzle extension assemblies 26 are provided to the installer with fitting plugs 50 temporarily engaged with nozzle fittings 40 to create a fluid resistant seal. Accordingly, once the appropriate length for fog generating system 20 is determined, and all solder joints are made, system 20 can be placed under fluid pressure via, for example, a hose connection (not shown). System 20 may then be evaluated for leaks.

Next, the installer drills openings, such as opening 92 (FIG. 6), through installation form 90 along the length of installation form 90 at the appropriate height and spacing corresponding to the subassembly of nozzle extension assemblies 26. For example, openings 92 may be created in installation form 90 corresponding to a distance (for example, approximately eighteen inches) between nozzle extension assemblies 26. The height of openings 92 might be, for example, at a midpoint of the desired height of the concrete decking structure.

Once all of openings 92 are made, second threaded fastener 86 is removed from stud 70 of each of fitting plugs 50. Stud 70 of each of fitting plugs 50 is then routed through a corresponding one of openings 92. Second threaded fastener 86 is coupled to stud 70 to retain stud 70 on second side 96 (i.e., the exterior side) of installation form 90. Second threaded fastener 86 is tightened against second side 96 of installation form 90 to draw open end 60 of each nozzle fitting 40 in abutment with first side 94 (i.e., the interior side) of installation form 90.

Once all nozzle fittings 40 are secured to installation form 90, the installer can than pour the concrete material into interior space 116 over nozzle extension assemblies 26 and fluid feed conduit 22. After the concrete is hardened, second threaded fasteners 86 are removed from studs 70 of fitting plugs 50. Installation form 90, second installation form 112, and spacer board 114 are then removed.

Figure 10:
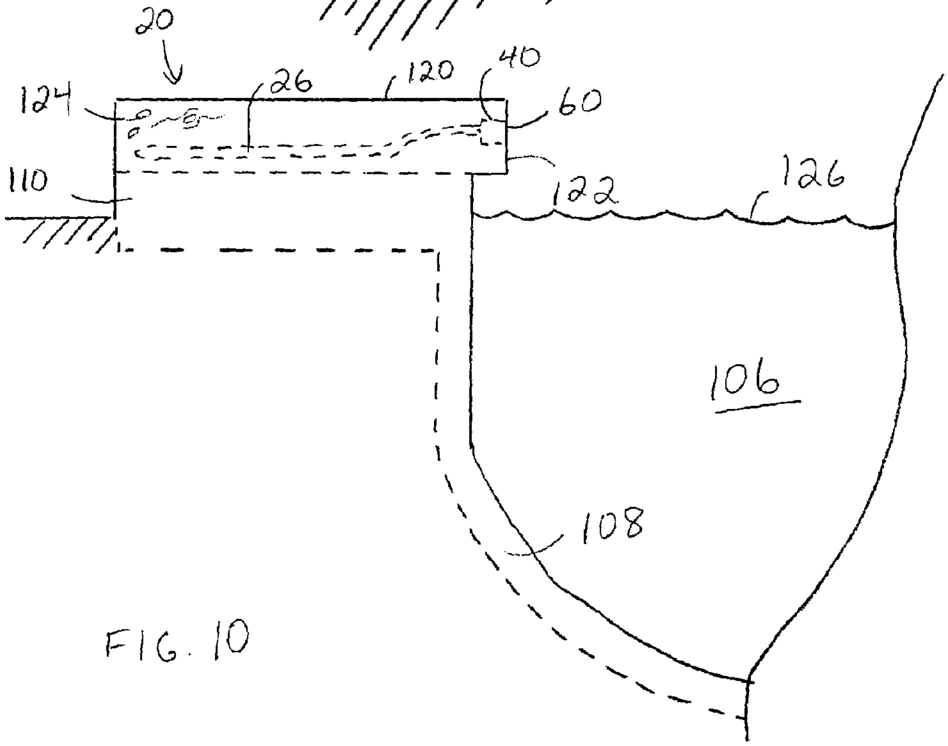
FIG. 10 shows a side representation of the fog generating system embedded in a pool structure.
Figure 11:
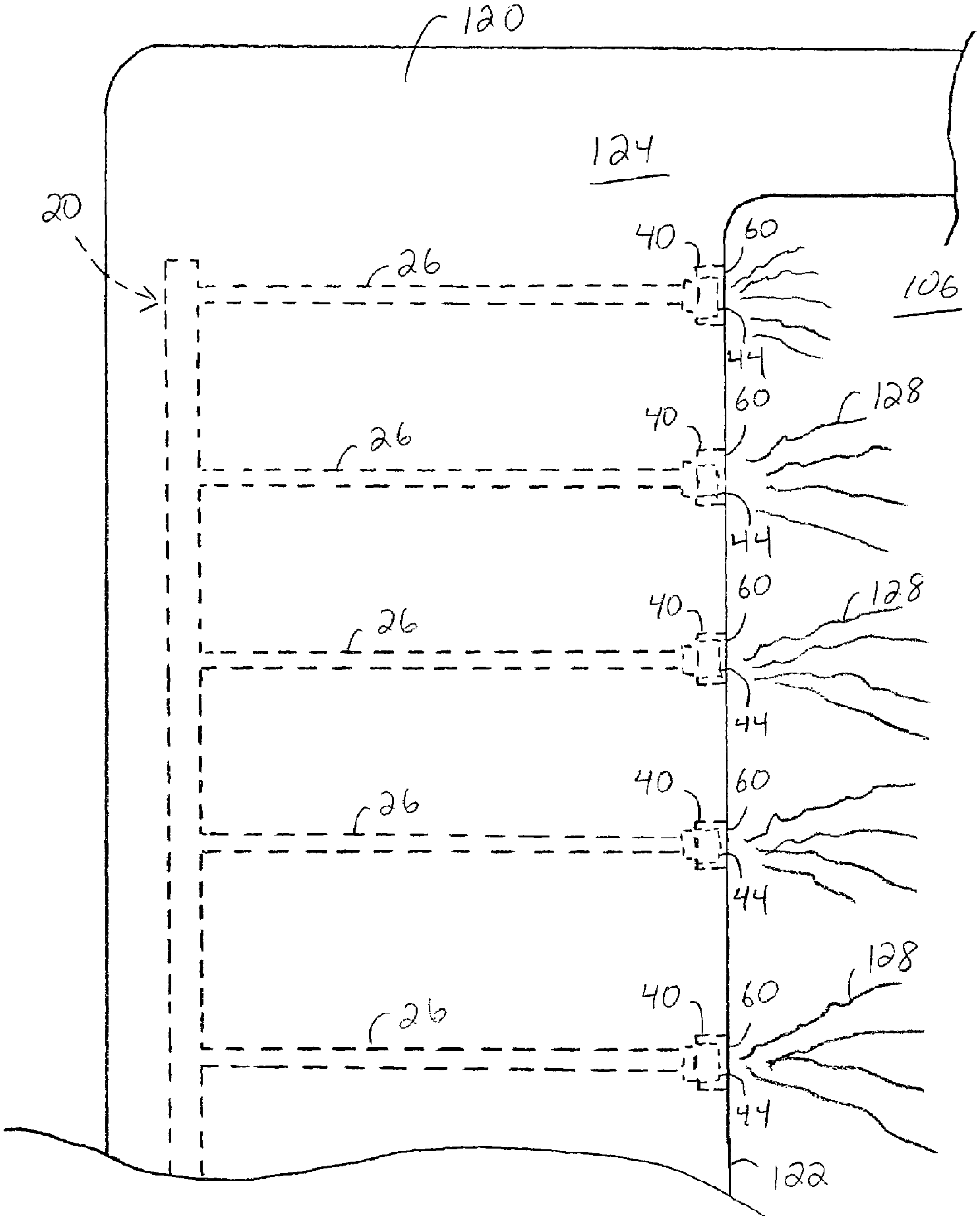
FIG. 11 shows a top view of pool decking into which the fog generating system is embedded.

Referring to FIGS. 10-11, FIG. 10 shows a side representation of fog generating system 20 embedded in a pool decking structure 120. FIG. 11 shows a top view of pool decking structure 120 into which fog generating system 20 is embedded. Pool decking structure 120 overlies bond beam 110 and includes a finished cantilever, vertical edge 122. After a concrete material 124 of structure 120 is poured between installation form 90 and second installation form 112 (FIG. 9), fog generating system 20 is fully embedded. However, with installation form 90 removed, it is evident that open end 60 of each of nozzle fittings 40 is flush with a vertical edge 122 and pointing directly out over a water surface 126 of swimming pool 106.

Fog generating system 20 is then taken off fluid pressure, and for each of nozzle extension assemblies 26 (FIG. 1), fitting plug 50 (FIG. 5) is removed from nozzle fitting 40 (FIG. 5). In particular, stud 70 (FIG. 5) is detached from threaded portion 64 (FIG. 4) of nozzle fitting 40. Finishing caps (not shown) may then be inserted into nozzle fittings 40 to protect nozzle fittings 40 during the laying of any finishing surface onto pool decking structure 120.

After finish work is complete on pool decking structure 120, the finishing caps are removed, fluid feed conduit 22 (FIG. 1) is connected to fluid source 24 (FIG. 1) and fog generating system 20 is flushed. Once clean of debris, misting nozzles 44 (FIG. 8) are installed through open ends 60 into cavities 68 of nozzle fittings 40. For each of nozzle fittings 40, threaded stem 100 (FIG. 7) of misting nozzle 44 is engaged with corresponding threaded portion 64 (FIG. 7). Following installation of misting nozzles 44, system 20 may be operated to verify a proper fog 128 from misting nozzles 44 and proper pressure rating on a pump of fluid source 20 (FIG. 1).

Nozzle fittings 40 provide clean and consistent openings in vertical edge 122 of pool decking structure 120 allowing misting nozzles 44 to be fully recessed and protected from possible damage, while still being available for removal or replacement as necessary. Thus, the recessed misting nozzles 44 are inconspicuous, yet still accessible for servicing. In addition, the placement of nozzle fittings 40 in pool decking structure 120 above bond beam 110 ensures that misting nozzles 44 are consistently placed three to four inches above water surface 126.

This distance above water surface 126 is far enough to prevent fog 128 from being sprayed directly onto water surface 126 where the majority of fog 128 would simply be absorbed by the water. However, this distance is still close enough to cause fog 128 to roll, or skip, along water surface 126 until it evaporates. Indeed, the force of fog 128 from misting nozzles 44 and the sheer volume of fog 128 being produced causes a dense curtain of fog 128 to move across water surface 126.

The distance across water surface 126 that fog 128 travels depends upon the current temperature and humidity, and the density of fog 128 for a particular pool installation. For example, fog generating system 20 located along a single edge of pool 106 and having an approximately eighteen inch spacing between misting nozzles 44 will yield fog 128 covering water surface 126 at one hundred ten degrees, approximately twenty-five percent humidity, and assuming little or no wind. Of course, fog 128 will evaporate less with lower temperatures and/or higher humidity, thus yielding a denser fog effect as conditions change. The curtain of fog 128 produced by fog generating system 20 creates an aesthetically pleasing tropical ambiance that changes in response to wind currents, temperature, and humidity. In addition, fog 128 is silent, as compared to the sound of a waterfall, and varies greatly in appearance from the more common waterfalls, fountains, and the like.

Figure 12:
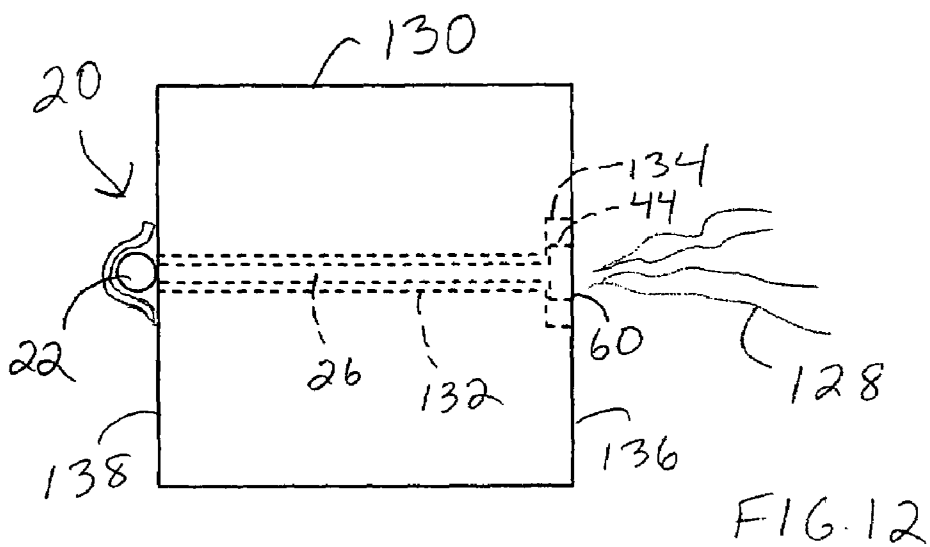
FIG. 12 shows a side view of a portion of a patio structure into which the fog generating system is incorporated.
Figure 13:
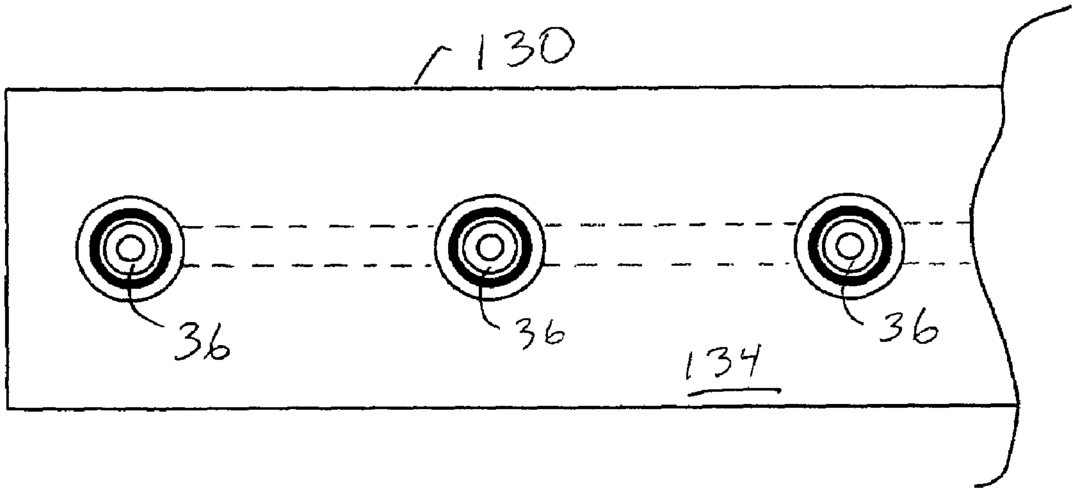
FIG. 13 shows a front view of the patio structure with recessed misting nozzles.

Referring to FIGS. 12-13, FIG. 12 shows a side view of a portion of a patio structure 130 into which fog generating system 20 is incorporated, and FIG. 13 shows a front view of patio structure 130 with recessed misting nozzles 44. Fog generating system 20 is described in connection with its incorporation into a concrete based deck material, and producing a fog effect over a surface of water. However, the present invention need not be limited to such an application. FIGS. 12-13 illustrate an alternative structure into which fog generating system 20 may be incorporated.

As shown, nozzle extension assemblies 26 may be arranged in channels 132 drilled through patio structure 130. Channels 132 may include a depression 134 adapted to house nozzle fittings 40 so that open ends 60 of nozzle fittings 40 are flush with a visible exterior surface 136 of patio structure 130. Fluid feed conduit 22 may then be coupled to a less visibly prominent side 138 of patio structure 130. Since misting nozzles 44 are recessed within nozzle fittings 40, they are inconspicuous, protected from damage, and yet still available for removal and/or replacement. Thus, fog generating system 20 can produce fog 128 on a patio area, from a wooden walkway, or even over the surface of a pool that has a wood, metal, or composite pool decking structure surrounding it.

In summary, the present invention teaches of a fog generating system. Nozzle extension assemblies of the fog generating system can be readily incorporated into a concrete material structure, wood, metal, or other structure. Nozzle fittings enable the recessed placement of misting nozzles so that they are inconspicuous, protected from damaged, and yet, still serviceable. Nozzle plugs may be coupled to the nozzle fittings during installation. The nozzle plugs facilitate leak testing of the system during installation, and enable accurate and consistent placement of the nozzle extension assemblies during, for example, a concrete pour. The consistent placement of nozzle fittings and their connected misting nozzles imparts a rolling fog bank across the surface of a body of water.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A fog generating system comprising:

a fluid feed conduit;

extension tubes spaced along said fluid feed conduit;

nozzle fittings, one each of said nozzle fittings being coupled to one each of said extension tubes, each of said nozzle fittings including a body having a base end, said base end having a threaded receptacle in fluid communication with one of said extension tubes;

misting nozzles releasably engaged with said nozzle fittings, and said misting nozzles being recessed within said nozzle fittings; and fitting plugs in temporary connection with said nozzle fittings prior to releasable engagement of said misting nozzles with said nozzle fittings, each of said fitting plugs including:

a stud for threaded attachment with said threaded receptacle;

a threaded fastener engaged with said stud; and a sealing washer directed onto said stud and disposed between said base end of said each nozzle fitting and said threaded fastener, said threaded fastener being tightened against said sealing washer to create a fluid resistant seal at said base end of said each nozzle fitting.

2. A fog generating system as claimed in claim 1 further comprising protective sleeves encasing said extension tubes.

3. A fog generating system as claimed in claim 2 wherein each of said protective sleeves exhibits an inner diameter that corresponds to an outer diameter of each of said extension tubes to form a friction fit between said each protective sleeve and said each extension tube.

4. A fog generating system as claimed in claim 1 wherein each of said nozzle fittings further comprises:

a hollow stem in fluid communication with one of said extension tubes; said threaded passage being in fluid communication with said hollow stem.

5. A fog generating system as claimed in claim 4 wherein said hollow stem is fixedly attached to said one of said extension tubes.

6. A fog generating system as claimed in claim 4 wherein said threaded receptacle is configured for releasable engagement with corresponding threads of one of said misting nozzles.

7. A fog generating system as claimed in claim 1 wherein said each of said nozzle fittings includes a cavity in which one of said misting nozzles is positioned.

8. A fog generating system as claimed in claim 7 wherein said one of said misting nozzles comprises a nozzle head, said nozzle head exhibiting a height, and said cavity exhibits a depth that is at least equivalent to said height of said nozzle head.

9. A fog generating system as claimed in claim 1 wherein said stud of said each of said fitting plugs is a continuous-thread stud.

10. A fog generating system as claimed in claim 1 wherein said stud extends beyond an open end of said body.

11. A fog generating system as claimed in claim 10 wherein said system is configured for installation in cooperation with an installation form, and said each of said fitting plugs further comprises a threaded fastener, said stud being configured to be routed through an opening in said installation form with said each of said nozzle fittings being located on a first side of said installation form, and said threaded fastener being engaged with said stud on a second side of said installation form.

12. A fog generating system as claimed in claim 1 wherein said system is configured to be embedded in a concrete material, and an open end of said nozzle fitting is configured to reside flush with an edge surface of said concrete material.

* * * * *